United States Patent [19]

Bass

[11] 4,149,789
[45] Apr. 17, 1979

[54] SHEET HANDLING METHOD AND APPARATUS FOR LARGE FORMAT CAMERAS

[75] Inventor: Peter R. Bass, Lexington, Mass.

[73] Assignee: Polaroid Corporation, Cambridge, Mass.

[21] Appl. No.: 863,991

[22] Filed: Dec. 23, 1977

[51] Int. Cl.² .................. G03B 17/50; G03B 1/00
[52] U.S. Cl. ............................ 354/86; 354/212
[58] Field of Search .............. 354/86, 92, 84, 187, 354/212, 216, 188, 345, 313, 319; 160/290 R

[56] References Cited

U.S. PATENT DOCUMENTS

| | | | |
|---|---|---|---|
| 1,070,043 | 8/1913 | Lake | 160/290 R |
| 2,220,917 | 11/1940 | Schwartz | 354/212 |
| 2,435,720 | 2/1948 | Land | 354/187 X |
| 3,967,297 | 6/1976 | Eloranta et al. | 354/212 |
| 4,054,231 | 10/1977 | Eloranta | 222/102 |

Primary Examiner—L. T. Hix
Assistant Examiner—Thomas H. Tarcza
Attorney, Agent, or Firm—Edward S. Roman

[57] ABSTRACT

A method and apparatus for positioning a sheet of photographic material exposed to a light image of a subject to be photographed in a large format, instant camera having a directly accessible translucent viewing screen positioned behind the camera film plane. A removable appliance is attached to the sheet material so that only a draw cord extends across the viewing screen after the camera is closed about the sheet and in no way interfers with image viewing for composition and focusing. The draw cord extends to the camera exterior so that the image receiving sheet may be fed by pulling it across the front of the viewing screen without first opening the camera back.

3 Claims, 4 Drawing Figures

SHEET HANDLING METHOD AND APPARATUS FOR LARGE FORMAT CAMERAS

BACKGROUND OF THE INVENTION

This invention relates to photographic sheet material handling methods and apparatus for large format cameras and more particularly, it concerns a photographic sheet feeding appliance and method for large format, instant cameras in which the image of a subject to be photographed is viewed for focusing and composition at the back of a translucent viewing glass prior to positioning the photosensitive sheet material in front of the glass for exposure and processing.

As described in a commonly assigned U.S. Pat. No. 4,054,231, entitled "Photographic Apparatus" and issued Oct. 18, 1977 to Vaito K. Eloranta, technology is available for incamera exposure and processing of photographic sheet material having image format areas of several square feet. Cameras employing this technology have been constructed and in use have demonstrated a capability for producing photographic prints of exceptionally high quality in formats as large as 40" by 84". While extremely large format cameras of this type are in the nature of a laboratory room which can be entered by an adult person and operated from within to photograph subjects positioned in the optical field of the camera, formats on the order of 20" by 24" can be accomodated by cameras adequately mobile to be transported and positioned in relation to stationary subjects.

The construction of such large format cameras conventionally entails the provision of a lens and shutter supported by a movable lens board defining a light-tight enclosure with a bellows and camera body. Associated with the camera body is a hinged back capable of supporting separate rolls of negative and positive photographic sheet material used in diffusion transfer photographic processing. As is well known in the art, such processing involves the exposure of negative sheet material and the distribution of a processing fluid between the exposed negative and a superimposed positive sheet to which the latent negative image is transferred as a positive photographic print. As disclosed in the afore-mentioned patent, the negative sheet material in large format cameras of the general type under discussion is preferably fed downwardly in the camera film plane from a roll located near the top of the camera body interior. After exposure, the negative is superimposed with a sheet of positive material fed from a roll located near the bottom of the camera body interior. The superimposed sheets are drawn between the nip of a motor driven processing roller pair so that processing fluid deposited on the sheets in accordance with the disclosure of the afore-mentioned patent is spread fully and uniformly over the image format area. As the two sheets and processing fluid are fed through the processing roller pair, they emerge from the bottom of the camera body and after a suitable imbibition time, are separated to provide the finished positive and the spent negative sheet to be discarded.

Because of the format size of such cameras, image composition and focusing is preferably observed at the back of a frosted or translucent glass usually with the aid of a hood to prevent interference by ambient light. Inasmuch as the negative sheet must be positioned in front of the glass for exposure, such viewing for image composition and focusing is not possible with the negative sheet in place for exposure. This problem has been accounted for in the past by providing the negative and positive sheet material with a sufficiently opaque backing that there is no danger of accidental exposure while the material is wound on the roll. By hinging the back of the camera, a length of the negative sheet may be paid from the supply roll with the camera back open sufficiently so that it may be fed through the exit opening at the bottom of the camera back and then a sufficient length of the negative pulled from the roll so that only unexposed negative sheet material is presented at the film plane of the camera for exposure and after the back has been closed. It will be apparent, however, that this procedure not only involved a substantial waste of the negative sheet material, but also required substantial manipulation of the camera back structure after image composition. The time required for such manipulation is an obvious deficiency in photographing live subjects, for example, where movement of the subject is likely.

SUMMARY OF THE PRESENT INVENTION

In accordance with the present invention, the problems heretofore associated with the manipulation of negative sheet material in large format cameras of the type referred to are substantially alleviated by a pulling appliance which may be attached to the leading edge of the negative film sheet prior to closure of the camera back and used after the camera back has been closed and after viewing for composition and focusing to draw the negative sheet material from its supply roll through the processing roller pair directly to a position for exposure with minimal wasteage of the negative sheet material. The appliance is preferably in the form of a thin strip of plastic or other suitably resilient material having a releasably adhesive face for repeated attachment and removal from the negative sheet material and connected with a draw cord capable of extending across the viewing screen without impairing image composition and focusing.

Among the objects of the present invention are, therefore: the provision of an improved method and apparatus for feeding photosensitive material from a supply roll contained in a large format camera; the provision of such an apparatus by which wasteage of photosensitive sheet material in such cameras is minimized; the provision of a simple re-usable appliance for manipulating a roll of photosensitive sheet material in large format cameras in a short period of time.

Other objects and further scope of applicability of the present invention will be apparent from the detailed description to follow taken in conjunction with the accompanying drawings in which like parts are designated by like reference numerals.

DETAILED DESCRIPTION OF THE PREFERRED EMBODIMENTS

Figure 1:
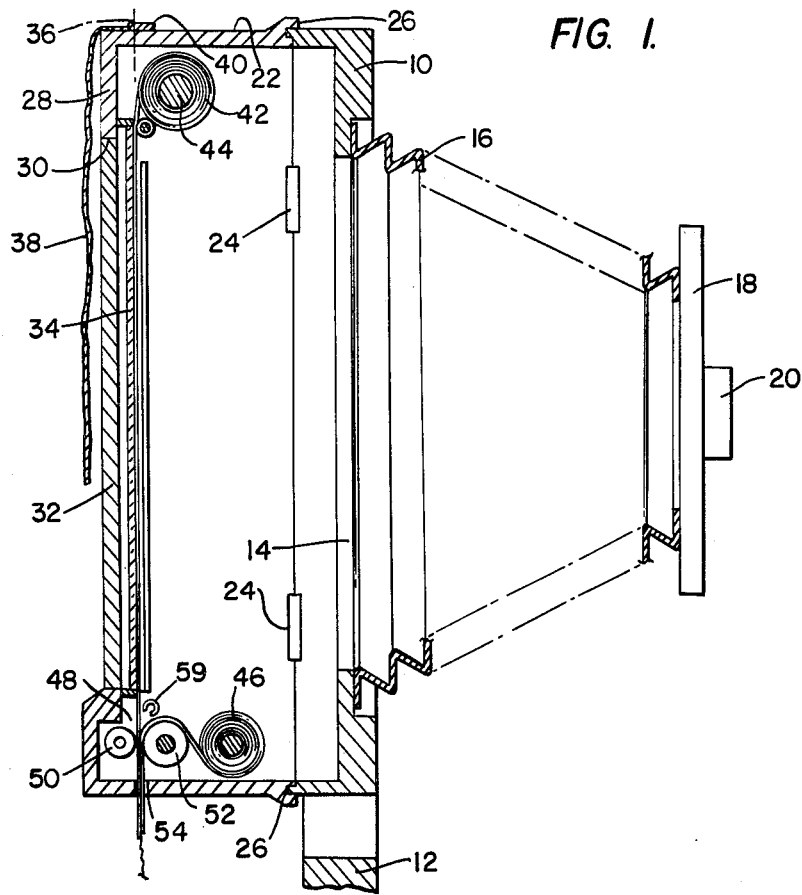
FIG. 1 is a cross-section, largely schematic, depicting the basic components of a large format camera to which the present invention applies.

In FIG. 1 of the drawings, a large format camera is shown schematically to include a body 10 appropriately supported by a carriage 12 and having a forwardly disposed opening 14 about which a bellows 16 is secured. The bellows is conventionally pleated for collapsibility and extends forwardly to a lens board 18 supporting an objective lens 20 as well as other conventional exposure components such as a shutter and diaphragm (not shown). Large format cameras of this type are capable of producing directly a photographic image on the order of 20" by 24" or larger. It will be appreciated, therefore, that the size of the body 10 and other components designated in FIG. 1 will be correspondingly large. For example, although the support 12 is shown only schematically in FIG. 1, in practice the support is a relatively elaborate structure and will extend to support the lens board 18 in a manner to position the lens 20 precisely on the optical axis of the camera.

A camera back 22 is pivotally supported from one side of the body 10 such as by hinges 24 and having an appropriate light seal 26 so that when closed in the position shown in FIG. 1, the back 22 defines with the body 10, the bellows 16 and the lens board 18, a light-tight enclosure. The back 22 is a box-like structure having a back wall 28 with an opening 30 provided with a hinged, light-tight door 32. The opening 30 is coextensive with a translucent viewing screen 34, the front surface of which locates the film plane 36 of the camera. A viewing hood 38 is preferably removably secured such as by a "Velcro" strip 40 secured along the top wall of the camera back 22.

Across the upper portion of the interior of the camera back 22 a roll of photosensitive, negative sheet material 42 is adapted to be supported on a rotatable mandrel 44. A similar roll of positive sheet material 46 is rotatably supported across the bottom of the interior camera back. In the condition illustrated in FIG. 1 where the back 22 is closed against the camera body and the door 32 closed into the opening 30, the camera is readied for exposure by drawing the negative sheet material 42 from the roll 44, downwardly in front of the viewing screen 34 to the nip 48 of the processing roll pair 50 and 52 and outwardly through a slot 54 in the bottom wall of the camera back 22. The positive sheet 46 is drawn from the roll over the pinch roll 52 and also downwardly through the slot 54. Side guides 56 and 58 are provided along the margins of the viewing screen 34 to assure retention of the negative sheet against the front face of the viewing screen 34 and thus oriented properly on the film plane 36.

After the negative sheet 42, positioned as shown in FIG. 1, is exposed to a subject to be photographed through the lens 20, a supply of diffusion transfer of processing fluid is deposited in the crease between the front of the negative sheet and roll pair. To facilitate this deposition of processing fluid, an inverted tubular trough 59 is located appropriately above the nip 48 of the processing roll pair. The trough communicates with an opening (not shown) in the side walls of the camera back through which a straw of processing fluid may be deposited in accordance with the teachings of the aforementioned U.S. Pat. No. 4,054,231. Once the processing fluid is in place, a motorized drive system (not shown) for the pinch rollers 50 and 52 is actuated so that the superimposed negative and positive sheets are fed downwardly through the slot 54 in a manner effecting a uniform spreading of the processing between the two sheets in accordance with well-known diffusion transfer processing.

Figure 2:
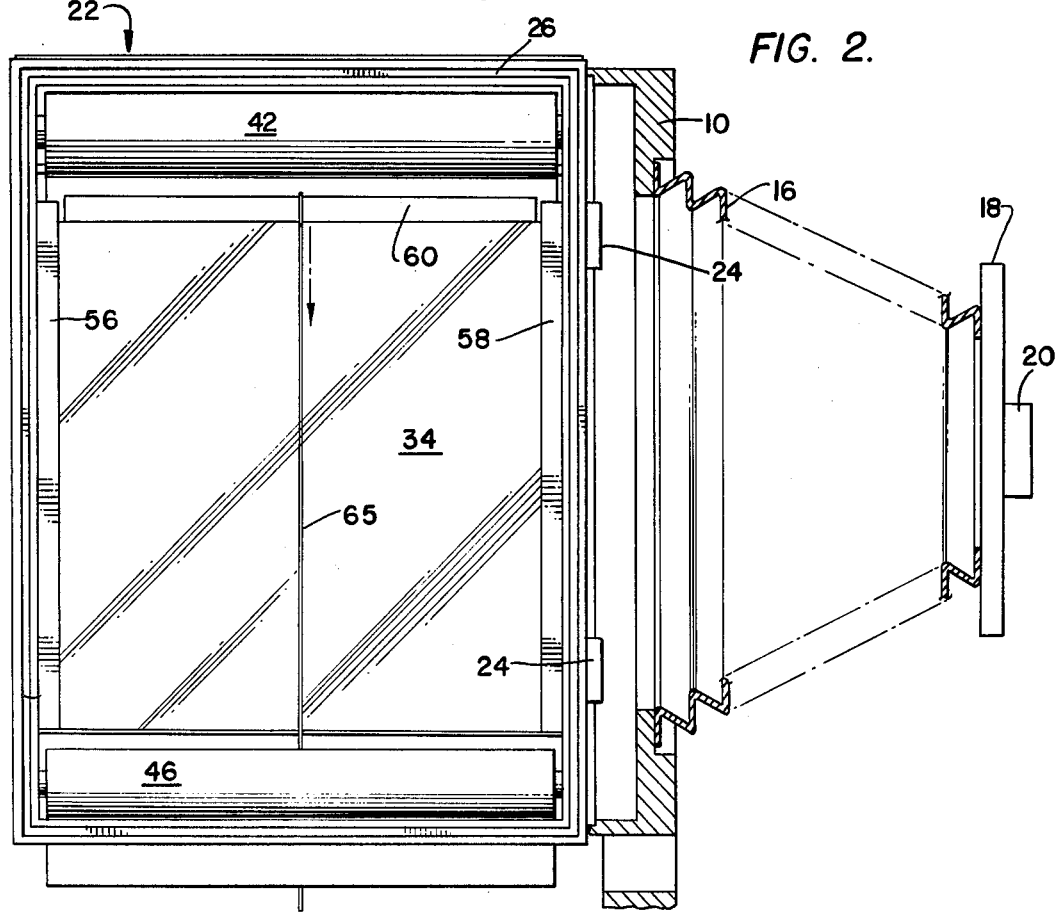
FIG. 2 is a similar view but with the back of the camera opened.
Figure 3:
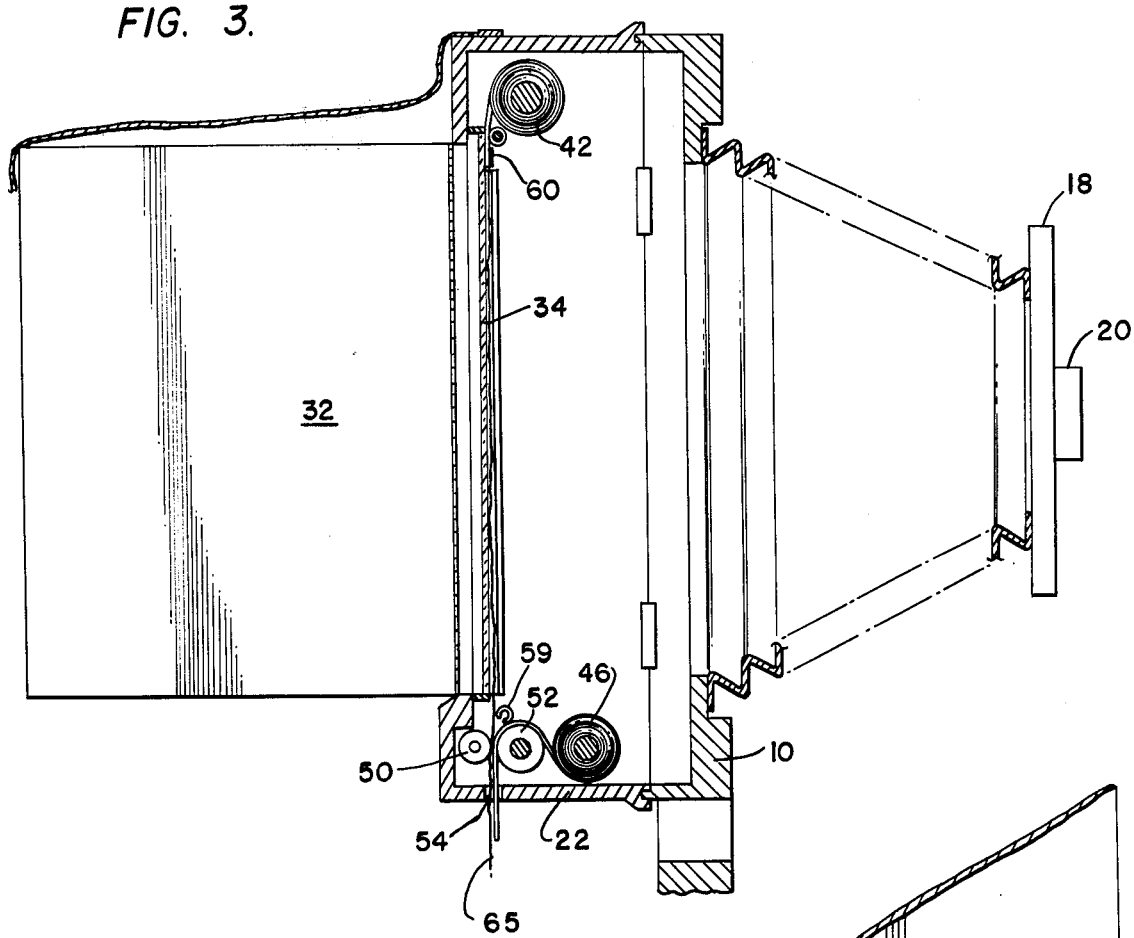
FIG. 3 is a view of the same camera conditioned for viewing a subject to be photographed.

The negative and positive sheet material 42 and 46 are provided with an opaque backing adequate to prevent any unintentional exposure of either sheet to light so long as they remained wound in the respective rolls. Accordingly, the camera back 22 can be hinged to the open position as shown in FIG. 2 for direct manual access to the sheets 42 and 46 without danger of damage to either by exposure to ambient light. It will be apparent, however, that if the negative sheet 44 was paid from the roll on the mandrel 44 downwardly over the viewing screen 34 with the back 22 opened, that portion of the negative sheet 42 extending from the roll would be exposed to ambient light and incapable thereafter of forming a latent image of a subject from light passing through the lens 20. It will be appreciated, moreover, that the subject to be photographed cannot be viewed through the back of the focusing plate 34 with the negative sheet material 42 previously positioned in front of the plate. This condition is depicted in FIG. 3 of the drawings where, with the camera back 22 in its closed position, the door 32 is opened so that an image presented on the front of the plate 34 may be viewed for composition and focusing. This dilemma is overcome in accordance with the present invention by providing a reusable adhesive pulling appliance generally designated by the reference numeral 60 and illustrated most clearly in FIG. 4 of the drawings. As shown, the appliance 60 includes a resilient plastic strip 61 of a thickness T, of a width W and of a length approximating or slightly less than the width of the negative sheet 42. The thickness T of the strip is kept to a minimum, preferably between 0.010 and 0.015 inches in order that the combined thickness of the strip 61, the negative sheet 42 and the positive sheet 46 will pass through the nip 48 of the pressure roll pair. The width of the strip is preferably on the order of one inch so that the strip will resist bending in a plane parallel to opposed surface areas 62 and 63.

Also, the one inch width of the strip coupled with its length is adequate to provide a releasable means for attaching the appliance 60 to the leading edge of the negative sheet 42. Specifically, these dimensions provide an adequate area of one of the opposed surfaces, the surface 63, to enable a secure attachment using a covering of pressure sensitive adhesive 64 on the surface area 63. By using commercially available, double-faced transparent adhesive tape, for the adhesive covering 64, not only is the attachment of the appliance 60 to the negative sheet sufficiently secure so that a tension force on the strip will feed the negative sheet 42 from the roll under a modest drag but also, the use of such doubled-faced tape enables replacement thereof as needed to accomodate repeated use of the appliance 60.

Fixed to the center of the strip is a draw cord 65 which is of a sufficient length to extend from the top of the viewing screen, throughout the length of the viewing screen through the processing rollers 50 and 52 and the slot 54. In other words, the length of the draw cord must be suitable to span the distance between the leading edge of the negative sheet prior to its being positioned for exposure to the exterior of the camera back in order that the end of the draw cord will be accessible when the back 22 is closed.

Figure 4:
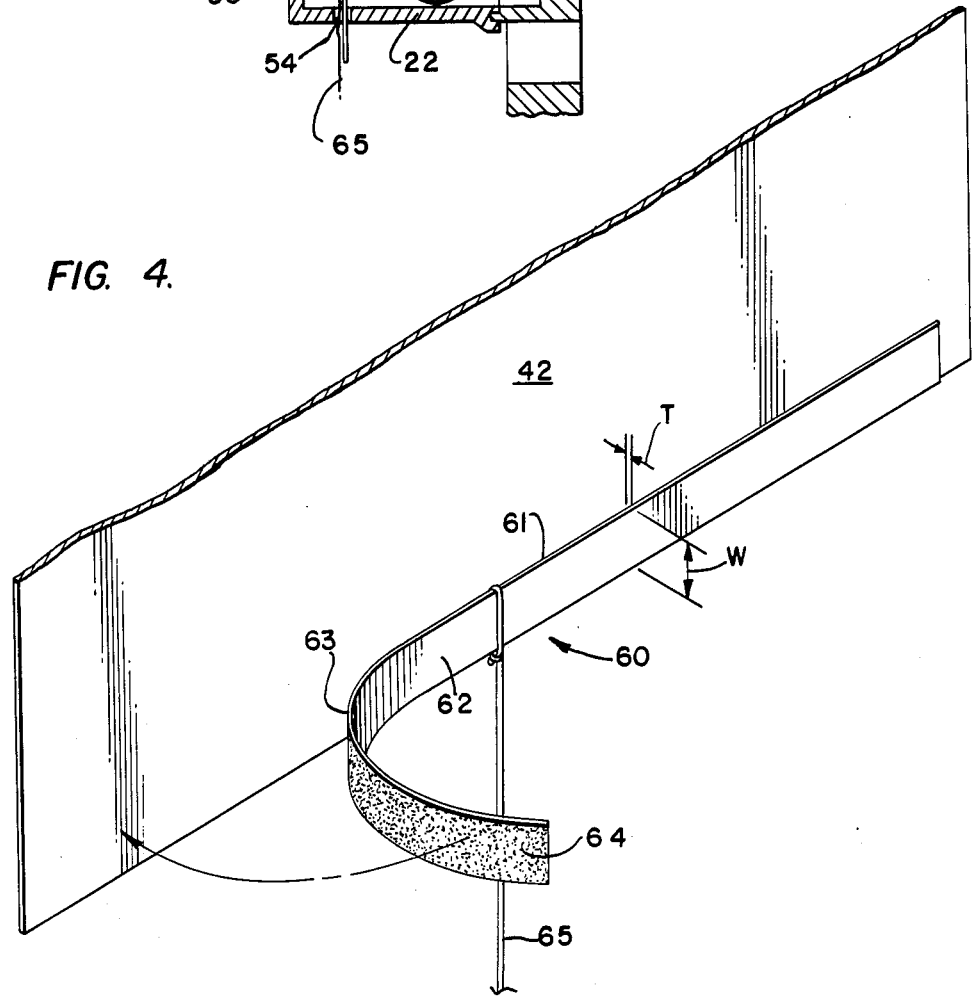
FIG. 4 is an enlarged fragmentary perspective view illustrating the negative sheet pulling appliance of the present invention.

Using the appliance illustrated in FIG. 4, it will be appreciated that with the camera back 22 in its open position as shown in FIG. 2 of the drawings, the strip 60 may be applied to the leading edge of the negative sheet paid from the roll 42 positioned at the entry portion of the guide strips 56 and 58. The cord 65 may then be threaded between the nip of the pinch roll pair 50-52 and downwardly through the opening 54 in back of the leading end of positive sheet material from the roll 46. With only the cord 65 passing across the viewing screen 34, the subject to be photographed may be viewed by opening the door 32 after the camera back 22 has been closed against the body 10. The draw cord 65 will present no impediment to complete viewing for focusing an image composition. Thereafter, the door 32 is closed and the draw cord 65 pulled manually out of the slot 54 until the strip 60 and leading edge of the negative sheet 42 emerges through the opening. At this time, the strip 60 may be removed from the negative sheet material. After exposure with the camera in the condition depicted by FIG. 1 of the drawings, processing may be effected in the manner described above.

After the superimposed negative and positive sheets with applied processing fluid extend fully from the slot 54 both the positive and negative sheets may be severed either manually or with a cutting appliance affixed to the camera back 22. That portion of the negative film strip extending between the line of severance and the supply roll on the mandrel 44 is then rewound back on the roll for a subsequent exposure cycle. In this manner, only leading end portions of the negative sheet material 4 supplied in the roll 42 must be discarded in each exposure cycle.

Thus, it will be appreciated that as a result of the present invention, a highly effective method and appliance is provided by which the procedure for exposing and processing photographic sheet material in large format cameras is greatly facilitated and by which the above-mentioned objectives are completely fulfilled. Also it is contemplated that modifications and/or changes may be made in the embodiment of the invention disclosed herein without departure from the inventive concepts manifested thereby. Accordingly, it is expressly intended that the foregoing description is illustrative of a preferred embodiment only, not limiting, and that the true spirit and scope of the present invention be determined by reference to the appended claims.

What is claimed is:

1. Apparatus for feeding photographic sheet material in a large format, instant camera having a back provided with a viewing screen through which an image to be photographed may be viewed by an operator prior to exposure operations, a roll of negative photographic sheet material supported above the viewing screen of sufficient length to facilitate the production of a plurality of large format photographs, a roll of positive sheet material supported below the viewing screen of sufficient length to facilitate the production of a plurality of large format photographs and a pair of processing rollers defining a pressure generating gap through which the positive and negative sheets are fed after exposure of a segment of the negative sheet at a film plane located in front of the viewing screen, said apparatus comprising:
    a thin strip of material having a length equal to approximately the width of the negative sheet material;
    means for releasably attaching one face of said thin strip of material across the leading edge of the negative sheet; and
    a draw cord fixed to said thin strip of material, said draw cord being of a length substantially greater than the length of the viewing screen so as to extend through the pair of processing rollers when the leading edge of the negative sheet is disposed above the viewing screen, whereby when the leading edge of the negative sheet is so disposed above the viewing screen, said draw cord will extend through the pressure generating gap of the processing rollers facilitating manual advancement of the negative sheet into exposure position across the viewing screen upon completion of the viewing operation so that after the processing of an exposed segment of the negative sheet, that segment can be removed and said apparatus attached to the remaining leading edge of the negative sheet to facilitate film manipulation operations associated with viewing, exposing and processing the next segment of the negative sheet, said thin strip of material being sufficiently rigid to remain substantially straight and not to flex out of alingment with the pressure generating gap of the pair of processing rollers as it is drawn theretowards.

2. The apparatus of claim 1 wherein said thin strip of material is between 0.010 and 0.015 inches in thickness and approximately 1 inch wide and said releasable attaching means comprises a layer of pressure sensitive adhesive comprising a double faced adhesive tape releasably secured to adhesion to one side of said strip.

3. A method of feeding photographic sheet material in a large format, instant camera having a back provided with a viewing screen through which an image to be photographed may be viewed and composed by an operator prior to exposure operations, a roll of negative photographic sheet material supported above the viewing screen of sufficient length to facilitate the production of a plurality of large format photographs, a roll of positive sheet material supported below the viewing screen of sufficient length to facilitate the production of a plurality of large format photographs and a pair of processing rollers defining a pressure generating gap through which the positive and negative sheets are simultaneously fed after exposure of a segment of the negative sheet at a film plane located in front of the viewing screen, said method comprising the steps of:
    attaching a thin strip of material having a length equal to approximately the width of the negative sheet material to the leading edge of the negative sheet material which extends from the camera subsequent to the processing and cutting of the previously exposed segment of the negative sheet, the thin strip of material further including a draw cord affixed thereto of substantially greater length than the length of the viewing screen;
    turning the negative roll enough to wind the negative sheet thereon and thereby draw the negative sheet through the roller gap and past the viewing screen so that the negative sheet entirely clears the viewing screen without drawing the end of the draw cord into the camera;
    viewing and composing the scene to be photographed through the viewing screen,;
    drawing the draw cord down so as to unwind the negative sheet from its roll and pull the leading edge of the negative sheet back through the pressure generating gap thereby placing a segment of the negative sheet in the film plane;

exposing the segment of the negative sheet in the film plane;

turning the processing rollers to advance the exposed segment of the negative sheet in concert with the positive sheet through the rollers and out of the camera;

cutting the exposed segment off from the negative sheet together with the processed segment of the positive sheet; and removing the thin strip of material from the exposed segment of negative sheet and attaching it to the leading edge of the negative sheet material which extends from the camera.

* * * * *